United States Patent [19]

Halasa et al.

[11] 3,725,369
[45] Apr. 3, 1973

[54] PROCESS FOR POSTREACTION OF ALKALI METAL-ACTIVE POLYMERS WITH SILICIC COMPOUNDS AND DIALKENYL COMPOUNDS

[75] Inventors: Adel F. Halasa, Bath; Ervin E. Schroeder, North Canton, both of Ohio

[73] Assignee: The Firestone Tire & Rubber Company, Akron, Ohio

[22] Filed: Jan. 6, 1971

[21] Appl. No.: 104,461

Related U.S. Application Data

[63] Continuation-in-part of Ser. No. 717,071, March 27, 1968, abandoned.

[52] U.S. Cl. .............260/85.1, 260/82.1, 260/83.7, 260/94.2 M, 260/94.7 A, 260/94.7 HA
[51] Int. Cl. .......C08f 27/00, C08f 19/08, C08d 5/02
[58] Field of Search ........260/94.7 R, 94.7 HA, 83.7, 260/85.1, 94.7 A

[56] References Cited

UNITED STATES PATENTS

| | | | |
|---|---|---|---|
| 3,231,635 | 1/1966 | Holden et al. | 260/880 |
| 3,281,383 | 10/1966 | Zelinski et al. | 260/880 |
| 3,244,664 | 4/1966 | Zelinski et al. | 260/94.7 |
| 3,280,084 | 10/1966 | Zelinski et al. | 260/83.7 |
| 3,383,377 | 5/1968 | Uraneck et al. | 260/94.7 |

FOREIGN PATENTS OR APPLICATIONS 1,025,295 4/1966 Great Britain.......................260/880

Primary Examiner—James A. Seidleck
Attorney—S. M. Clark and S. B. Kuykendall

[57] ABSTRACT

The process described herein involves a method of converting relatively low molecular weight polymers of conjugated dienes prepared by alkali metal-catalyzed polymerizations, such as alkyllithium catalyzed polymerizations, and still containing active lithium or other alkali metal therein, by postreaction with a mixture of divinyl benzene and a silicon halide or ester or analogous material containing nitrogen or sulfur in place of the oxygen, to give higher molecular weight polymers having improved cold flow resistance, improved processability and green strength, etc. The improvements are much greater than can be effected by postreaction with either divinylbenzene or silicon halide, etc. individually, or by having divinyl benzene present during the polymerization. The silicon halide, etc. includes chloro, bromo and iodo compounds and can have one to four or even more halogen atoms per molecule. The postreacted products are highly branched elastomers having a broad molecular weight distribution and possessing less cold flow than the polymers from which they are produced. Surprisingly, the reaction product displays little or no tendency for cold flow even after extension with oil.

19 Claims, No Drawings

3,725,369

PROCESS FOR POSTREACTION OF ALKALI METAL-ACTIVE POLYMERS WITH SILICIC COMPOUNDS AND DIALKENYL COMPOUNDS

This application is a continuation-in-part of copending application Ser. No. 717,071, filed Mar. 27, 1968, now abandoned.

BACKGROUND OF THE INVENTION

1. Field of the Invention

This invention relates to a method for postreacting lithium-active polymers, or other alkali metal-active polymers, particularly diene-alkenyl-aryl copolymers, such as butadiene-styrene copolymers, with a mixture of divinyl benzene and a silicic compound, as described herein, such as silicon tetrachloride, thereby converting relatively low molecular weight active polymers to high molecular weight branched polymers having improved cold flow resistance.

2. Related Prior Art

It is known in the prior art to copolymerize butadiene and styrene in the presence of a small amount of divinyl benzene. For example, British Pat. No. 968,756 discloses such a process. However, considerable gel formation often results during continuous polymerization.

It is also known to postreact lithium-active polymers with silicon tetrachloride and the like. For example, U.S. Pat. No. 3,244,664 discloses such postreactions. U.S. Pat. No. 3,078,254 discloses a process for reacting polymers containing terminally positioned alkali metal with active-halogen-containing compounds such as bis(chloromethyl) ether, α, α, α-trichlorotoluene, 1,4-bis(chloromethyl) benzene, and the like. However, in such cases coupling is insufficient to give the desired molecular weight without sacrifice of the desired processability and green strength.

SUMMARY OF THE INVENTION

In accordance with the present invention, it has now been found that lithium-containing polymers or other polymers containing active sodium, potassium, cesium or rubidium, such as butadiene-styrene copolymers prepared by alkyllithium catalyst copolymerizations, can be converted to cold flow resistant polymers by postreaction with a mixture of divinyl benzene and a silicic compound such as silane, a siloxane or a silicon compound having at least one X group wherein X is halogen or YR, R is an aliphatic, aromatic or cycloaliphatic hydrocarbon group and Y is O, NR or S.

The results obtained are improved over those obtained by postreaction with either individually. For example, with a lithium-active butadiene-styrene copolymer, the molecular weight can be increased, without gelling, to a high value, allowing the product to be extended with oil to increase the plasticity of the polymer to an appropriate range. Moreover, in view of this ability to increase the molecular weight easily and so greatly, the molecular weight from the initial polymerization can be kept even lower than normal, and thereby permit easier handling.

While the postreactions of the prior art with silicon tetrachloride by itself and bis-(chloromethyl) ether and other active-halogen-containing compounds are in effect coupling reactions, it is believed that the postreaction of the present invention is different from and effects much greater improvement in the polymers than can be effected by mere coupling. While it is not intended that the inventors be committed to any particular theory, it is believed that the silicic compound acts as an activator in cross-linking the alkali metal-active polymers with the divinyl benzene. This is substantiated by the fact that silicon compounds having only one X group are active for the purpose of this invention although those having two or more X groups are preferred. Still in the process of this invention the cross-linking is controlled in a manner to give desirable molecular weights and desirable molecular weight distribution. This is supported by the fact that the type of product produced and the properties of the product are different from what would be expected from coupling.

The processability and green strength of the postreated polymer are much better than for a linear polymer of corresponding plasticity. Consequently, the ultimate elastomer composition has improved cold flow resistance, improved processability and green strength. "Green strength" is known in the rubber art as the cohesive strength of an unvulcanized rubber or rubber composition and the resistance it shows to being pulled apart.

Also, an advantage of the postreaction process of this invention is that a relatively low molecular weight elastomer, such as a butadiene-styrene copolymer having a high plasticity, can be reacted to give a product having a plasticity considerably lower than is required for ultimate use. The improved properties of the postreated product permit oil extension to increase the plasticity to the desired range.

The postreaction of this invention is advantageously performed at a temperature in the range of –50°–150° C., preferably 20°–120° C. using a polymer containing 0.1–10 millimoles of Li in the form of C-Li, or other alkali metal, preferably 0.4–0.8 millimole per 100 parts of polymer. The silicic compound is used in a proportion of 0.1–100 millimoles of halogen or ester, etc., preferably 0.25–10 millimole per 100 parts of polymer. The amount of divinyl benzene is advantageously at least 0.1 millimole per 100 parts by weight of the polymer, preferably equimolar with the halogen, and preferably no more than 5.

The postreacted product of this invention has a desirable molecular weight distribution as indicated by gel permeation chromatography (GPC) determined according to standard tests as described in the literature.

While copolymers of all proportions of diene and monovinyl aromatic compounds are broadly embraced by the invention, it is preferred that the copolymers contain from about 5 to about 50 percent monovinyl aromatic compound and correspondingly from about 95 to about 50 percent butadiene-1,3 or other diene.

Suitable alkenyl aryl compounds for preparing the lithium-active or other alkali-metal active polymers are represented by the formula

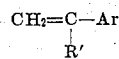

wherein R' represents hydrogen or methyl, so that the alkenyl group includes vinyl and α-methylvinyl or isopropenyl, and Ar represents phenyl, naphthyl and the alkyl, cycloalkyl, aryl,alkaryl, aralkyl, alkoxy, aryloxy and dialkylamino derivatives of phenyl and naphthyl, with the total number of carbon atoms in the derivative groups not exceeding 12.

Various alkenyl aryl compounds that can be used included: styrene, α-methylstryene, 1-vinylnaphthalene, 2-vinylnaphthalene, α-methylvinylnaphthalene and alkyl, cycloalkyl, aryl, alkaryl, aralkyl, alkoxy, aryloxy and dialkylamino derivatives thereof in which the total number of carbon atoms in the combined substituents is generally not greater than 12. Examples of these aromatic monomers include:

4-isopropenyltoluene
3-methylstyrene (3-vinyltoluene)
3,5-diethylstyrene
4-n-propyl styrene
2,4,6-trimethylstyrene
4-dodecylstyrene
3-methyl-5-n-hexylstyrene
4-cyclohexylstyrene
4-phenylstyrene
2-ethyl-4-benzylstyrene
4-p-tolylstyrene
3,5-diphenylstyrene
2,4,6-tri-tert.-butylstyrene
2,3,4,5-tetramethylstyrene
4-(4-phenyl-n-butyl)styrene
3-(4-n-hexylphenyl)styrene
4-methoxystyrene
3,5-diphenoxystyrene
3-decylstyrene
2,6-dimethyl-4-hexoxystyrene
4-dimethylaminostyrene
3,5-diethylaminostyrene
4-methoxy-6-di-n-propylaminostyrene
4,5-dimethyl-1-vinylnaphthalene
3-ethyl-1-vinylnaphthalene
6-isopropyl-1-vinylnaphthalene
2,4-diisopropyl-1-vinylnaphthalene
3,6-di-p-tolyl-1-vinylnaphthalene
4,5-diethyl-8-octyl-1-vinylnaphthalene
6-cyclohexyl-1-vinylnaphthalene
3,4,5,6-tetramethyl-1-vinylnaphthalene
3,6-di-n-hexyl-1-vinylnaphthalene
5-(2,4,6-trimethylphenyl)-1-vinylnaphthalene
3,6-diethyl-2-vinylnaphthalene
7-dodecyl-2-vinylnaphthalene
4-n-propyl-5-n-butyl-2-vinylnaphthalene
6-benzyl-2-vinylnaphthalene
3-methyl-5,6-diethyl-8-n-propyl-2-vinylnaphthalene
4-o-tolyl-2-vinylnaphthalene
5-(3-phenyl-n-propyl)-2-vinylnaphthalene
4-methyl-1-vinylnaphthalene
6-phenyl-1-vinylnaphthalene
3,6-dimethylamino-1-vinylnaphthalene
7-dihexyl-2-vinylnaphthalene
4-methyl-α-methylstyrene
2-ethyl-5-isopropenylstyrene The dienes suitable for preparing alkali metal-active polymers for use in the practice of this invention can be represented by the formula

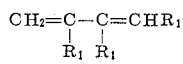

wherein $R_1$ represents hydrogen and alkyl or an aryl radical, preferably one having no more than two carbon atoms.

In addition to butadiene-1,3 the various other conjugated dienes that can be used include isoprene, 2,3-dimethyl-1,3-butadiene, 1,3-pentadiene (piperylene), 2-methyl-3-ethyl-1,3-butadiene, 3-methyl-1,3-pentadiene, 2-methyl-3-ethyl-1,3-pentadiene, 2-ethyl-1,3-pentadiene, 1,3-hexadiene, 2-methyl-1,3-hexadiene, 1,3-heptadiene, 3-methyl-1,3-heptadiene, 1,3-octadiene, 3-butyl-1,3-octadiene, 3,4-dimethyl-1,3-hexadiene, 3-n-propyl-1,3-pentadiene, 4,5-diethyl-1,3-octadiene, phenyl-1,3-butadiene, 2,3-diethyl-1,3-butadiene, 2,3-di-n-propyl-1,3-butadiene, 2-methyl-3-isopropyl-1,3-butadiene, and the like.

The preferred catalysts for the polymerizations used in preparing the lithium-active polymers suitable for use in this invention are alkyllithium compounds, but the hydrocarbon lithium compounds are generally operable to produce the improved polymers of the invention and are hydrocarbons having, for example, from one to 40 carbon atoms in which lithium has replaced hydrogen. Suitably lithium hydrocarbons include, for example, alkyl lithium compounds such as methyl lithium, ethyl lithium, butyl lithium, amyl lithium, hexyl lithium, 2-ethylhexyl lithium, n-dodecyl lithium and n-hexadecyl lithium. Unsaturated lithium hydrocarbons are also operable, such as allyl lithium, methallyl lithium, and the like. Also operable are the aryl, alkaryl and aralkyl compounds, such as phenyl lithium, the several tolyl and xylyl lithiums, alpha-and beta-naphthyl lithium, and the like. While lithium catalysts are preferred for this purpose, the other alkali metals can be used, i.e., sodium, potassium, cesium and rubidium and compounds of these corresponding to the lithium compounds listed herein are likewise suitable.

Mixtures of such hydrocarbon lithium compounds may also be employed. For example, desirable catalysts may be prepared by reacting an initial hydrocarbon lithium compound successively with an alcohol and then with an olefin such as isopropylene (a technique analogous to the "Alfin" technique), whereby a greater or lesser proportion of the lithium from the initial hydrocarbon goes to form lithium alkoxide and to form a new organo-lithium compound with the olefin.

Surprisingly, the catalytic action of the hydrocarbon lithium catalysts employed to produce the polymers of the invention does not appear to be affected by the presence of salts of other alkali metals as impurities. For instance, in the synthesis of hydrocarbon alkali metal compounds, alkali metal halides are produced as by-products, while in catalysts produced by the "Alfin" technique, alkali metal alkoxides are formed. Where in these polymerization reactions alkali metals other than lithium are employed, either in the form of the metal alone or in alkali metal hydrocarbons, these extraneous compounds exert a different effect upon the structure produced.

Also suitable for this purpose are the other anionic polymerization catalysts listed in U.S. Pat. Nos. 3,317,918 and 3,170,903, such as the polylithium hydrocarbons, lithium dihydrocarbon amides, metallic lithium, salt mixtures with colloidally dispersed lithium metal, composites of a fluorine-containing salt and lithium metal or lithium hydrocarbon, and lithium adducts of polynuclear aromatic hydrocarbons such as naphthalene, diphenyl and anthracene.

It is essential that air be excluded during the preparation of all of the catalyst materials described. Thus, whether the catalyst be lithium metal or lithium-containing compounds it is necessary that the catalyst be prepared in closed containers provided with means for exclusion of air. Preferably, the catalyst will be employed shortly after preparation, although the catalyst may be stored for reasonable periods of time if substantial contact with the atmosphere is prevented during removal from the vessel in which the catalyst is prepared, during storage and during subsequent introduction into the reaction chamber. As will be illustrated, the catalyst often may be produced in situ in the reaction vessel.

In general, the larger the amount of catalyst used, the more rapidly the polymerization will proceed at a given temperature, and the lower the molecular weight of the resulting product. Desirably, sufficient catalyst should be employed to provide about 0.1-100 gram millimoles of active metal for each 100 grams of monomer in the polymerization mixture.

Since moisture tends to use up catalyst, it should be excluded from the reaction zone insofar as is possible. Oxygen, nitrogen and other components of the air seriously inhibit the desired polymerization reaction and consequently should be excluded from the reaction zone. In laboratory or small scale equipment, all of these substances conveniently may be removed by bringing the polymerization charge to a boil and venting a small proportion of the charge (e.g., about 10 percent) prior to sealing the reactor and effecting polymerization. In large scale production, however, charging of the reactor is preferably conducted under an inert atmosphere.

It has been found that the molecular weight and proportion of cis-1,4 structure of the copolymers generally increase as the temperature of polymerization is decreased. Additionally, the reaction is quite difficult to control at elevated temperatures, particularly where monomer of the preferred highest purity is employed. It has also been found that gel content increases as higher polymerization temperatures are employed, especially with lithium containing catalysts. Consequently, it is desirable to operate at the lowest temperature at which a practical yield of the desired product may be obtained. Since polymerization reactions of the type contemplated ordinarily require a considerable induction period, it is often desirable to initiate the polymerization reaction at a higher temperature and then lower the temperature to the desired level by suitable cooling means once the polymerization reaction has been initiated. In this manner, the induction period will be lessened and the benefits of low temperature polymerization, as above indicated, may be obtained. In general, lithium-active copolymers suitable for use in this invention are advantageously produced at temperatures between 0° C. and 150° C. A polymerization temperature of from 40° C. to 70° C. is preferred.

The polymerization is advantageously performed in a non-polar, non-acidic solvent, preferably a hydrocarbon such as those illustrated below. While the polymerization can be performed without solvent, in which case the polymerization product is deposited as a rubbery mass or the polymerization can be terminated well before completion in order to have unreacted monomer serve as suspension medium, generally about 25-50 percent by volume of solvent is used, based on the total volume.

Solvents operable in the preparation of the lithium-active or other alkali metal-active polymers must be non-polar, non-acidic, organic substances. Suitable solvents include the saturated aliphatic hydrocarbon solvents, such as the straight and branched chain paraffins and cyclo-paraffins containing from three to 16 carbon atoms which include, without limitation, propane, pentane, hexane, petroleum ether, heptane, dodecane, cyclopentane, cyclohexane, methyl cyclohexane, and the like. Aromatic solvents such as benzene, toluene, xylene, and the like are also operable. Mono-olefins can also be used as solvents when a catalyst system is used to which the olefin is immune to polymerization. For example as pointed out above the alpha olefins are immune to polymerization with n-Bu lithium unless combined with a chelating compound such as sym--dimethyl ethylene diamine. Therefore, in the absence of such an effective catalyst system, olefins can be used as solvents, including butylenes, amylenes, hexenes, cyclohexene and the like.

The same considerations as to purity and absence of interfering compouns applying to the monomers also apply to the solvent. A treatment which has been found particularly advantageous for the purification of paraffin solvents, such as petroleum ether consists of agitating the solvent with concentrated sulfuric acid and thereafter repeatedly washing with water. The solvent may then be suitably dehydrated by passage through silica gel, alumina, calcium chloride or other dehydrating or absorbing media, and thereafter distilled. As in the case of the monomer, the solvent after being purified desirably should be handled in contact only with its own vapor or with atmospheres containing only its vapor and inert gases such as helium and argon.

Laboratory scale polymerization reactions producing lithium-active or other alkali metal-active polymers may conveniently be conducted in glass beverage bottles sealed with aluminum lined crown caps. The polymerization bottles should be carefully cleaned and dried before use. The catalyst employed may be added to the bottle by weight, or, where possible, the catalyst can be melted and added by volume. In some instances, it is desirable to add the catalyst as a suspension in the monomer or solvent. The monomer is added by volume, desirable employing sufficient excess so that about 10 percent of the charge can be vented to remove moisture, oxygen and air from the bottle. The removal of oxygen from the free air space above the monomer in the polymerization bottle as well as dissolved oxygen in the monomer is an important step in the bottle loading procedure. The cap is placed loosely on the bottle and the monomer is brought to a vigorous boil as by placing the bottle on a heated sand bath. When approximately 10 percent of the charge has been vented, the bottle is sealed rapidly. Such procedure substantially excludes the air and oxygen which drastically inhibit polymerization.

The sealed bottles may be placed on a polymerization wheel immersed in a liquid maintained at a constant temperature, and rotated. Alternatively, the charge bottle may be allowed to stand stationary in a contant temperature bath or otherwise heated or cooled until the polymerization reaction is complete. Ordinarily, the static system which requires a considerably longer reaction, may in some instances be attractive where higher molecular weights are desired. After the induction period the charge goes through a period of thickening and finally becomes solid. At the end of the polymerization reaction, when properly conducted, all of the monomer has been consumed and there is a partial vacuum in the free space of the reaction vessel.

The time for completion of polymerization varies with the temperature, the time required decreasing with increase in temperature, in any case being completed within 3-4 hours and at the highest temperatures in the cited range substantial polymerization is effected within one-half hour.

After polymerization has been completed, and the bottle cooled to handling temperature, the polymer may be removed by cutting the bottle open. Precautions should be taken to avoid destruction of the C-Li structure prior to addition of the haloalkane and dialkenyl monomer.

Small and large scale polymerizations can also be run in stainless steel stirred reactors.

Corresponding techniques are employed in large scale polymerization processes. Usually the reaction will be carried out in a closed autoclave provided with a heat transfer jacket and a rotary agitator. Avoidance of oxygen contamination is most easily secured by evacuating the vessel prior to charging the monomer (and solvent, if used) and employing an inert atmosphere. To insure the purity of the monomer and solvent, a silica gel or other suitable adsorption column is preferably inserted in the charging line employed for introduction of these materials to the reactor. The catalyst is preferably charged last, conveniently from an auxiliary charging vessel pressured with an inert gas and communicating with the polymerization vessel through a valved conduit. It is desirable to provide a reflux condenser to assist in the regulation of the reaction temperature.

In addition to divinyl benzene other dialkenyl aryl compounds that can be used in the practice of this invention, although they are more expensive and not so easily available, include: divinyl naphthalene, divinyl diphenyl, divinyl toluene, divinyl xylene, divinyl anisole, divinyl ethyl benzene, divinyl chlorobenzene, divinyl methylnaphthalene, divinyl ethylnaphthalene, divinyl methyldiphenyl, divinyl ethyldiphenyl, etc.

Silicic compounds suitable for the practice of this invention include silanes, siloxanes and silicon halides, esters, amides and thioesters, preferably the tetra-substituted derivatives such as the tetrahalides, tetraesters and the like such as for example silicon tetrachloride, silicon tetrabromide, silicon tetrafluoride and silicon tetraiodide.

The siloxanes can be both the open chain and cyclic siloxanes. The silanes contain one silicon atom per molecule and the open chain siloxanes contain two to 12 silicon atoms per molecule while the cyclic siloxanes have three to six silicon atoms per molecule. The silicon tetrahalides and silanes can be represented by the formula $R_n SiX_{4-n}$, wherein R is hydrogen or an alkyl, cycloalkyl, aryl, alkaryl or aralkyl radical containing from one to 20 carbon atoms, X is halogen or YR wherein Y is O, NR or S, with R being of the same scope as hereinbefore defined, and n is an integer from 0 to 2. It can be seen from this description that the silanes contain at least two of the groups consisting of halogen, OR, $NR_2$ or SR. The open chain siloxanes can be represented by the formula

wherein R and X are as above described, $a$ is an integer from 0 to 3, $b$ is an integer from 0 to 2, the sum of the $a$'s and $b$'s is at least 2, and $q$ is an integer from 0 to 10.

Cyclic siloxanes can be represented by the formula

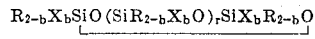

wherein R, X and $b$ are as above described, the sum of the $b$'s is at least 2, and $r$ is an integer from 1 to 4.

Examples of the various types of silicic compounds, in addition to silicon tetrahalides, include the following:

Trifluorosilane
Dichlorosilane
Monochlorosilane
Trichlorosilane
Dibromosilane
Monobromosilane
Triiodosilane
Difluoro(dimethyl)silane
Trifluoro(isopropyl) silane
Trichloro(ethyl) silane
Trichloro(nonyl) silane
Tribromo(decyl)silane
Diiodo(didodecyl)silane
Chloro(trimethyl)silane
Trichloro(cicosyl)silane
Dibromo(dicyclohexyl)silane
Difluoro(dicyclopentyl)silane
Trichloro(methylcyclohexyl)silane
Dichloro(diphenyl)silane
Tribromo(benzyl)silane
Trichloro(4-tolyl)silane
Chloro(tribenzyl)silane
Dichloro(dibenzyl) silane
Methoxy(triethyl)silane
Ethyl(trimethoxy)silane
Phenyl(tri-n-butoxy)silane
Dicyclohexyl(diphenoxy)silane
Dieicoxyl(dibenzoxy)silane
Didecyl(didecoxy)silane
Tetraethoxysilane (ethyl orthosilicate
Tetradodecoxysilane (dodecyl orthosilicate)
Tetraphenoxysilane (phenyl orthosilicate)
Dibutoxy-di(tetradecoxy)silane
Methyl-tri(methylmercapto)silane
Nonyl-tri(nonylmercapto)silane
Phenyl-tri(phenylmercapto) silane
Eicosyl-tri(eicosylmercapto)silane
Tetra(methylamino)silane
Tetra(nonylamino)silane
Tetra(tridecylamino) silane
Methylamino(trimethyl)silane
Methyl-tri(methylamino)silane
Dioctyl-di(octylamino)silane
Di(pentadecyl)-di(ethylamino)silane
Ethyl tri(methyl-n-propylamino) silane
Dibenzyl-di(benzylamino)silane
Diphenyl-di(dieicosylamino)silane
Cyclohexyl-tri(dicyclohexylamino)silane
Cyclohexylamino(tricyclohexyl)silane Chloro(heptyl)(dihexoxy)silane
Dibromo-di(4-tolylmercapto)silane
Dichloro-di di(dodecylamino) silane
Hexamethoxydisiloxane
Hexaethoxydisiloxane
Sym.-tetradecoxydisiloxane
1,3-Dichloro-5-butyltrisiloxane
(1,1,1,7,7,7-Hexachloro-3,5-diethyl)tetrasiloxane
1,1,5,5,9,9-Hexa(ethoxy)1,9-diethyl pentasiloxane
1,1,15,15-Tetra(eicosoxy)octasiloxane
(1,1,19,19-Tetrabromo-3,7,9,11-tetramethyl)-decasiloxane
1,1,1,23,23,23,-Hexa(butylamino)dodecasiloxane
1,1,1-Tri(phenylmercapto)hexasiloxane
3,5-Dichlorotetrasiloxane
1,3,5-Tri(benzoxy)trisiloxane
1,3,5,7-Tri(cyclohexoxy)tetrasiloxane
Hexamethoxycyclotrisiloxane
Hexachlorocyclotrisiloxane
Octabromocyclotetrasiloxane
1,3,5-Tri(dimethylamino)cyclotrisiloxane
1,1,5,5-Tetra(hexylmercapto)-3,3,7,7-tetramethyl-cyclotetrasiloxane
1,1,5,5,9,9-Hexachlorocyclohexasiloxane and the like. Of the above materials, the silicon tetrahalide and the orthosilicates are preferred.

The invention is illustrated by the following examples. These examples are given for purpose of illustration and are not intended in any way to restrict the scope of the invention nor the manner in which it can be practiced. Unless specified otherwise, parts and percentages are given by weight.

EXAMPLE I

In batch preparation "live" butadiene polymer is prepared in a 2-quart stainless steel reactor equipped with stirrer and adapted for removal of samples. A mixture of 250 parts of butadiene, 45 parts of styrene and 1,220 parts of hexane (calculated to give a polymerization product containing 17 percent solids) is introduced into the reactor. The temperature is raised to 120° F. (49° C.) after which 0.555 millimole of n-butyllithium per 100 parts of monomer is introduced. After 3 hours at this temperature, a sample is removed and the percent solids determined by evaporation of the solvent. When such sample testing shows a conversion of 98–100 percent, the "live" polymer is ready for postreaction. The amount of polymer remaining in the reactor is calculated by subtracting from the original amount of monomer, the amount removed as polymer in the sample testing. From this, the proportionate amount of polymeric lithium remaining in the reactor is also calculated. The reactor temperature is then raised to 175° F. (80° C.), and the silicon compound and divinyl benzene are added in a proportion of 0.138 millimoles of silicon tetrachloride and 0.02 parts (0.15 millimole) of divinyl benzene per 100 parts of monomer. Two comparative experiments are also performed in which silicon tetrachloride or divinyl benzene alone is used. The post-reactants are added and allowed to react with the live or lithium-active polymer and samples are removed for a determination of Williams Plasticity (cold flow properties) and Cepar rapid extrusion. In each case the product produced with the combination of postreactants showed superior properties. The proportions and results are given below in Table I.

TABLE I

| | | | |
|---|---|---|---|
| Divinyl Benzene | 0.15 Mm. | 0.15 Mm. | |
| Silicon Tetrachloride | 0.138 Mm. | | 0.138 Mm. |
| Williams Plasticity 3 Min. | 3.84 | 3.85 | 3.39 |
| 1 Min. Recovery | 1.75 | 0.90 | 0.79 |
| Cepar Rapid Extrusion 10 lbs. Load mm./hr. | 4.80 | | 19.80 |

EXAMPLE II

The procedure of Example I is repeated a number of times using the proportions and obtaining the results shown below in Table II:

TABLE II

| | | | | | |
|---|---|---|---|---|---|
| Divinyl Benzene (Mm) | 0.23 | 0.31 | 0.38 | 0.69 | — |
| Silicon Tetrachloride (Mm) | 0.115 | 0.11 | 0.11 | — | 0.11 |
| Williams Plasticity at 73° F. 3 Min. | 4.72 | 4.79 | 4.75 | 4.50* | 3.88 |
| 1 Min. Recovery | 2.59 | 2.63 | 2.66 | 2.99 | 1.24 |
| Cepar Rapid Extrusion at 210° F. % W/L | 68.2 | 65.2 | 65 | 74** | 59.3*** |

* Product could not be processed in plant operations because of poor processability and poor green strength.
  ** Exceeds desired range.
  *** Below desired range.

When the above runs are repeated in continuous operation as in Example III similar results are obtained except that the product gelled when DVB was used alone.

EXAMPLE III

In a continuous process a lithium-active polymer is fed to a centrifugal pump, which serves as a mixer, and the silicon tetrachloride and the divinyl benzene (DVB) are added to the polymer solution in the pump as a single solution in an inert solvent such as hexane. The solution of the two postreactants is prepared by first drying the solvent with a dessicant to prevent undesirable side reactions with the alkali metal. The DVB is likewise dried and added to the hexane, and the SiCl₄ is also added to the hexane. The two reactants are used in the proportions used in the three comparative experiments of Example I. The rate of addition of the reactant is controlled to give the desired ratio of the reactants to the amount of lithium contained in the polymer. the resultant solution is fed from the centrifugal pump to a reactor provided with agitation and means for maintaining a temperature of 180°–200° F. (82°–93° C.) for a sufficient residence time to complete the postreaction. Results are similar to those of Example I except that the product using divinyl benzene alone gelled.

EXAMPLE IV

The procedures of Examples I and II are followed in a number of experiments using a butadiene homopolymer having approximately 1 percent active lithium. Solutions of postreactants are used which have silicon tetrachloride and divinyl benzene in varying ratios to each other, and these are fed in at a controlled rate to give the desired proportion as in Examples I and II based on the amount of active lithium in the polymer. Results similar to those of Examples I and II are obtained.

EXAMPLE V

A styrene-butadiene copolymer is prepared using n-butyllithium as catalyst to produce a copolymer having 25 percent styrene and 1 percent active lithium therein, and having a dilute solution viscosity of 1.5. This copolymer is used in a series of tests to determine the effect of silicon tetrachloride and divinyl benzene as postreactants individually and in combination in accordance with the procedure described in Example I. The results are similar to those obtained in Example I.

EXAMPLE VI

The procedure of Example I is repeated a number of times using individually the following lithium-active polymers in place of the lithium-active butadiene-styrene copolymer of Example I:

Polyisoprene
Polystyrene
Polyvinyl naphthalene
Polybutene-1
Polymethylmethacrylate
Polyvinyl acetate
Polyalphamethylstyrene
Polyallylmethylphthalate
Polyvinylmethylether
Butadiene-Isoprene (50–50 copolymer)
Butadiene-piperylene (75–25 copolymer)
Acrylonitrile-vinyl acetate (50–50 copolymer)
Isoprene-styrene (75–25 copolymer)

In each instance improved properties are noted with respect to higher molecular weight and improved extrudability when the combination of postreactants is used.

EXAMPLE VII

The procedures of Examples I and IV are repeated a number of times using individually in place of the silicon tetrachloride of those examples an equivalent amount of the following silicic compounds respectively:

(EtO)$_4$Si (Ethyl orthosilicate)
Trifluorosilane
Monochlorosilane
Triiodosilane
Trichlorononylsilane
Dichlorodiphenylsilane
Methoxy(triethyl)silane
1,3-Dichloro-5-butyltrisiloxane
Hexamethoxydisiloxane
3,5-Dichlorotetrasiloxane
1,3,5-Tri(dimethylamino)cyclotrisiloxane
1,1,5,5-Tetra(hexylmercapto)-3,3,7,7-tetramethyl-cyclotetrasiloxane In each case improvement is noted in higher molecular weight and in extrudability when the respective combination of postreactants is used.

EXAMPLE VIII

The procedure of Example II is repeated a number of times using individually in place of the dialkenyl monomer of that example an equivalent amount individually of the following dialkenyl monomers:

Divinyl naphthalene
Diisopropenyl benzene
Diallyl benzene
Divinyl diphenyl

In each case improvement is noted in higher molecular weight and extrudability when the combination of postreactants is used.

EXAMPLE IX

The procedure of Example II is repeated a number of times using in place of the lithium-activated polymer of that example a corresponding polymer which has been formed so as to give the corresponding sodium-active polymer, potassium-active polymer, cesium-active polymer, rubidium-active polymer, by using the corresponding alkali metal n-butyl compound to catalyze the polymerization. In each case the postreacted product is notably improved in molecular weight and processability as noted above.

The novel polymers can be blended with other known polymers to provide useful commercial compositions for fabrication into useful shapes and articles. The novel rubbery polymers are advantageously blended with known rubbers (e.g., natural rubber, SBR, BR, IR, IIR, CR, ISR), with or without extending oils, for forming vulcanizates of great technical importance. The novel rubber polymers are advantageously compounded with the known reinforcing carbon blacks to produce useful commercial stocks, which may also contain one or more additional rubber polymers, and may also contain 5 to 100 phr (parts per 100 parts of the rubber) of extending oil or plasticizer. Sulfur and other known vulcanizing agents for natural rubber and the commercial synthetic rubbers are useful for forming vulcanizable stocks containing a novel polymer of the invention. Known antioxidants, stabilizers and antiozonants for natural and commercial synthetic rubbers find similar utility in compositions containing the novel polymers of the invention. Known methods of mixing, forming, fabricating and curing compositions of natural and commercial synthetic rubbers are applicable to and useful with compositions containing the novel polymers of the invention. The novel polymers of the invention are especially useful in pneumatic tire tread, sidewall and carcass compositions, and the considerations of this paragraph are especially relevant to the use of the novel polymers in tires.

While certain features of this invention have been described in detail with respect to various embodiments thereof, it will, of course, be apparent that other modifications can be made within the spirit and scope of this invention and it is not intended to limit the invention to the exact details shown above except insofar as they are defined in the following claims.

The invention claimed is:

1. A process for increasing the molecular weight while retaining processability of the resultant polymer comprising the steps of reacting an alkali metal-active polymer of a conjugated diene containing 0.1–10 millimoles of alkali metal attached to said polymer per 100 parts of polymer, at a temperature of −50° to 150° C. with an intimate mixture of silicic compound and divinyl benzene, said silicic compound being used in a proportion to five 0.1–100 millimoles of silicic compound per 100 parts of polymer and said divinyl benzene being used in a proportion of at least 0.1 millimole per 100 parts by weight of polymer, said reaction being conducted for at least one minute, said silicic compound having a formula selected from the group consisting of $$R_nSiX_{4-n},$$

$$R_{3-a}X_aSiO(SiR_{2-b}X_bO)_qSiX_aR_{3-a} \text{ and}$$

$$R_{2-b}X_bSiO(SiR_{2-b}X_bO)_rSiX_bR_{2-b}O$$

where
R is hydrogen or an alkyl, cycloalkyl, aryl, alkaryl or aralkyl radical containing from one to 20 carbon atoms;
X is halogen or YR wherein Y is O, NR or S;
$n$ is an integer from 0 to 2;
$a$ is an integer from 0 to 3;
$b$ is an integer from 0 to 2;
the sum of the $a$'s and $b$'s is at least 2;
$r$ is an integer from 1 to 4; and
$q$ is an integer from 0 to 10;
said diene polymer containing at least 50 percent by weight of conjugated diene and any comonomer that is incorporated is an alkenyl aryl compound having the formula

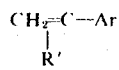

wherein R' represents hydrogen or methyl and Ar represents phenyl or naphthyl or a derivative thereof having no more than 12 carbon atoms in the derivative groups, which derivative groups are selected from the class consisting of alkyl, cycloakyl, aryl alkaryl, aralkyl, alkoxy, aryloxy, and dialkylamino.

2. The process of claim 1 in which said reaction is conducted for at least 1 hour.

3. The process of claim 1 in which said reaction is conducted until there has been at least 50 percent increase in molecular weight.

4. The process of claim 1 in which said temperature is 20°–120° C.

5. The process of claim 1 in which said alkali metal is lithium.

6. The process of claim 1 in which said alkali metal is present in said polymer is a proportion of 0.4–0.8 millimole per 100 parts by weight of said polymer.

7. The process of claim 1 in which said silicon compound is used in a proportion of 0.25–10 millimoles per 100 parts by weight of polymer.

8. The process of claim 1 in which said divinyl benzene is used in an amount approximately equimolar with the halogen.

9. The process of claim 1 in which said polymer is polybutadiene.

10. The process of claim 1 in which said polymer is a copolymer of butadiene and styrene containing 5–50 percent by weight of styrene copolymerized therein.

11. The process of claim 9 in which said silicon compound is silicon tetrachloride.

12. The process of claim 1 in which said silicon compound is silicon tetrachloride.

13. The process of claim 1 in which said alkali metal is lithium and said polymer is a polymeric butadiene.

14. The process of claim 13 in which said silicon compound is silicon tetrachloride.

15. The process of claim 13 in which said silicon compound is ethyl orthosilicate.

16. The process of claim 13 in which said polymeric butadiene is a butadiene-styrene copolymer having 5–50 percent by weight styrene copolymerized therein.

17. The process of claim 13 in which said polymeric butadiene is polybutadiene.

18. The process of claim 1 in which said polymer is an isoprene-styrene copolymer having 5–50 percent by weight styrene copolymerized therein.

19. A polymer produced according to the process of claim 1.

* * * * *